April 20, 1965
G. LEMESLE ETAL
3,179,266
NUCLEAR REACTOR LOADING MACHINE
Filed Feb. 12, 1963
3 Sheets-Sheet 1
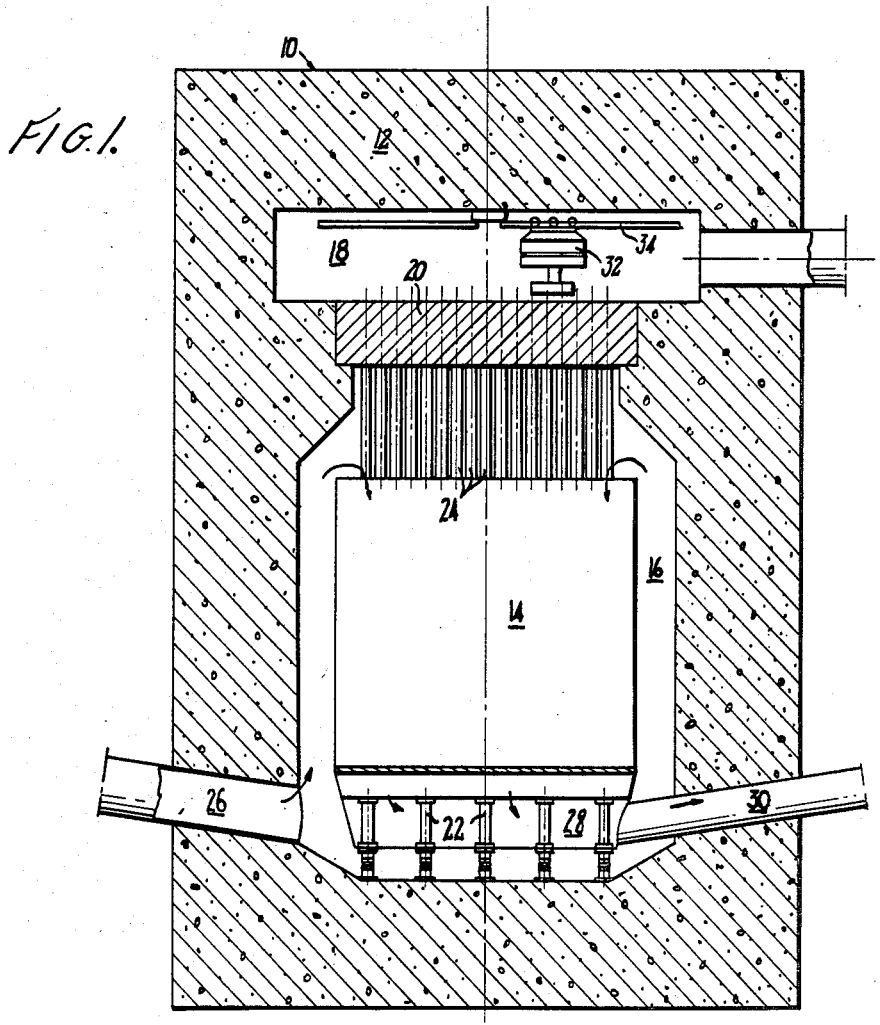
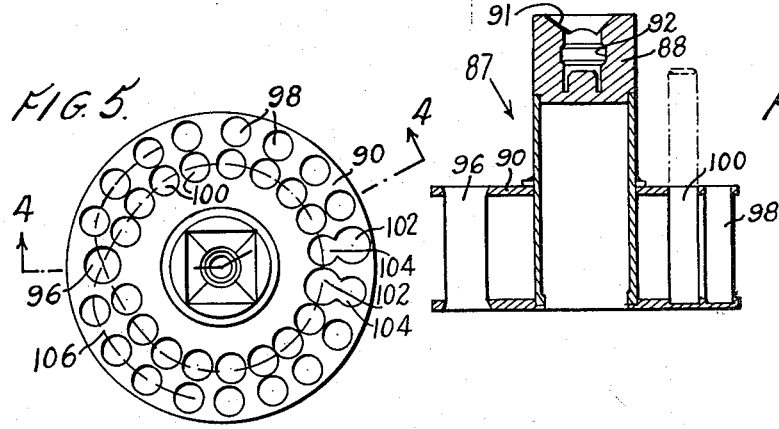

United States Patent Office

3,179,266
Patented Apr. 20, 1965

3,179,266
NUCLEAR REACTOR LOADING MACHINE
Georges Lemesle, Roger Martin, and Marcel Monteil, Paris, Roland Roche, Clamart, and Pierre Rouge, Gif-sur-Yvette, France, assignors to Commissariat à l'Energie Atomique, Paris, France
Filed Feb. 12, 1963, Ser. No. 257,893
Claims priority, application France, Feb. 20, 1962, 888,607
8 Claims. (Cl. 214—18)

This invention relates to handling machines for the transfer of objects, such as nuclear fuel elements, into and from a fuel channel of a nuclear reactor. While the ensuing disclosure will refer principally to the use of the invention in handling fuel elements for re-fuelling purposes, it is to be understood that the invention is equally applicable for handling under comparable conditions other kinds of objects that may have to be transferred into and from one or more channels of a nuclear reactor.

In the re-fuelling of nuclear reactors wherein the nuclear fuel elements are contained in parallel, e.g., vertical, channels of the reactor core, apparatus must be provided for periodically removing the spent or irradiated fuel elements from the channels and inserting fresh elements in their place. This apparatus may consist in a handling machine positionable, e.g., in a horizontal plane, in relation to the (generally upper) ends of the fuel channels (or of charge tubes associated therewith), and having prehensile means, such as a winch-operated grab, insertable into the channel for extracting the spent fuel elements and introducing the fresh elements.

In order to expedite such re-fuelling operations by making it possible to handle more than one fuel element and/or service more than one fuel channel without intervening displacements of the handling machine, it is old in the art to provide the machine with a rotary magazine having an array of chambers adapted to receive both spent and fresh elements. The magazine, containing fresh fuel elements in some of its chambers and space for spent elements in others, is rotated stepwise through suitable means from the handling machine, and the prehensile means is operated at sequential positions of the magazine to transfer the spent elements from a reactor channel into empty chambers of the magazine, and transfer fresh elements from the magazine into the channel. Thereafter the spent elements are discharged, a new set of fresh elements is supplied to the magazine and the handling machine is moved to a new position for similarly re-fuelling one or more further channels of the reactor core.

A serious drawback of the handling systems of this kind arises from the need to rotate at frequent intervals the magazine, with its heavy load of fresh and/or spent nuclear elements, with respect to the frame of the handling machine. The heavy loads involved, the necessarily unbalanced conditions with which these loads act on the magazine at certain stages of the re-fuelling cycle, and the maintenance difficulties characterizing such nuclear equipment in general, result in operating difficulties.

It is a general object of the invention to provide handling apparatus for nuclear installations, of the class described, which will permit fuelling and similar operations to be carried out rapidly and easily, while completely overcoming the above-stated deficiencies.

A more specific object is to provide such apparatus wherein the magazine is arranged to be locked in a fixed position with respect to the frame of the handling machine throughout the servicing of one or more reactor channels, thus completely overcoming the difficulties inherent to a rotatable magazine.

Still another object of the invention is to provide an improved form of fuel magazine for use with such handling systems.

In accordance with an important aspect of the invention, there is provided a handling machine for transferring a plurality of objects into and from a channel of a nuclear reactor, which comprises in combination a magazine having a series of chambers for receiving said objects, a handling unit positionable in operative relation with respect to said reactor channel, means on said unit engageable with said magazine for positively locking the magazine in a fixed predetermined position relative to the unit, prehensile means on said unit engageable with each of said objects, and means for displacing said prehensile means relative to the magazine in the locked condition of the latter between a position wherein said prehensile means is engageable with an object contained in said channel and any one of a series of positions wherein said prehensile means is engageable with an object contained in a selected one of the magazine chambers.

An exemplary embodiment of the invention, given by way of illustration but not of limitation, is shown in the accompanying drawings wherein:

FIG. 1 is a simplified vertical sectional view of a nuclear reactor provided with a handling machine according to the invention;

FIG. 4 shows a magazine for use with the handling unit, in vertical axial section on line 4—4 of FIG. 5;

FIG. 5 is a corresponding view in plan; and

Figure 2:
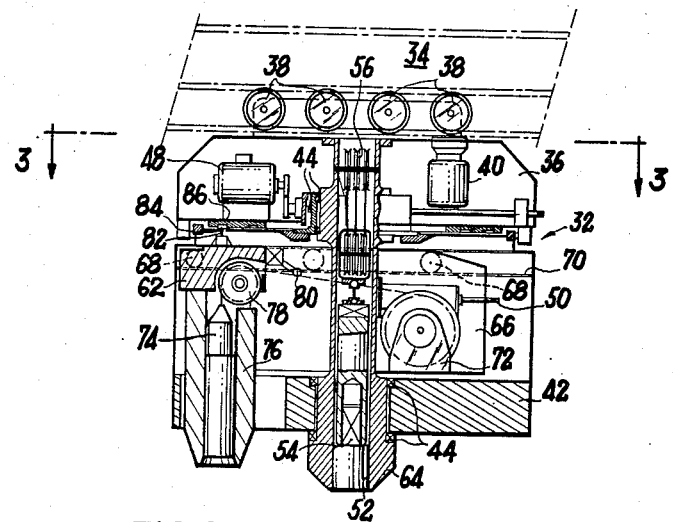
FIG. 2 shows the handling unit in section along line 2—2 of FIG. 3.

Referring now to FIG. 1, the handling machine of the invention is illustrated in small-scale view at 32 as associated with a nuclear reactor generally designated 10. The reactor is schematically shown as being of the solid-moderator, gas-cooled type, and includes a vessel 12 of prestressed concrete serving both for biological shielding and for pressure containment. The vessel is adapted to withstand the high pressure of the coolant gas (e.g., carbon dioxide) circulated through the reactor core. Formed within the shield 12 is a lower or main chamber 16 containing the reactor core 14, and an upper chamber 18 or "garret" of smaller vertical extent, separated from the lower chamber by a concrete slab 20; the fuel handling machine 32 of the invention is movable in the garret 18.

The reactor core 14, shown in schematic outline, is supported within lower chamber 16 on a set of posts or jack-legs 22 from the bottom of the chamber. The interior of the core, not shown, may comprise the usual stack of graphite bars formed with spaced vertical fuel channels containing trains of fuel cartridges, with the cooling gas being circulated downwardly through the channels around the cartridges to cool them as will presently appear. From the top of core 14 project a set of charge tubes 24 aligned with the fuel channels and projecting through the slab 20. The charge tubes are provided with removable plugs, not shown, for limiting the flow of gas between the main chamber 16 and garret 18.

The gaseous coolant, such as carbon dioxide, cooled in externally provided heat exchange means (not shown), is delivered to the bottom of main chamber 16 through a side conduit 26 extending through shield 12. Propelled by blowers (not shown), the gas rises through the annular space between the outer sidewalls of core 14 and the walls of chamber 16, flows down the fuel channels in the core, where it removes heat from the fuel elements, into a bottom collector space 28 below the core, and out through a side outlet conduit 30, as indicated by the arrows in FIG. 1. The direction of gas flow may of course be reversed from that described and shown if and when desired. Pipe means (not shown) deliver into the garret chamber 18 fresh decontaminated gas from a suitable source such as regenerator and cooling appliances. The gas pressure in garret 18 is at all times maintained somewhat higher than in the main chamber 16, to prevent gas leakage from the latter to the former and thus radioactive contamination of the equipment within the garret. This over-pressure in the garret 18 as well as the total leakage flow area through the cap 20 should be so predetermined with respect to the flow section area of the charge tubes 24 that the removal of a charge tube plug will not substantially alter the total rate of leakage flow between the chambers.

The general set-up so far described is more or less conventional. The invention is concerned with the construction of the handling or fuelling machine 32 located in the upper chamber or garret 18 and serving to introduce fresh nuclear fuel elements, and withdraw spent elements, into and from the fuel channels of core 14 through the charge tubes 24. The particular embodiment of the machine of the invention that is to be described herein was especially developed for use in conjunction with an apparatus of the type disclosed in applicants' U.S. application Serial No. 257,894. But it will be apparent however that the machine, as described or with only minor modifications, is adaptable to many other arrangements.

The fuelling machine or handling unit 32 is positionable within the garret 18 so as to scan the horizontal area of cap 20 containing the upper orifices of charge tubes 24, through an arrangement which herein is of the polar-coordinate type, including a radially-extending monorail 34 rotatable near the top of chamber 18 about a central overhead pivot, with the machine 32 being displaceable through rollers, as presently described in detail, along the length of the monorail 34. It will be evident however that any other suitable means may be provided to enable the machine 32 to scan the desired horizontal area of cap 20 and such scanning means may involve rectangular rather than polar coordinates if preferred.

Figure 3:
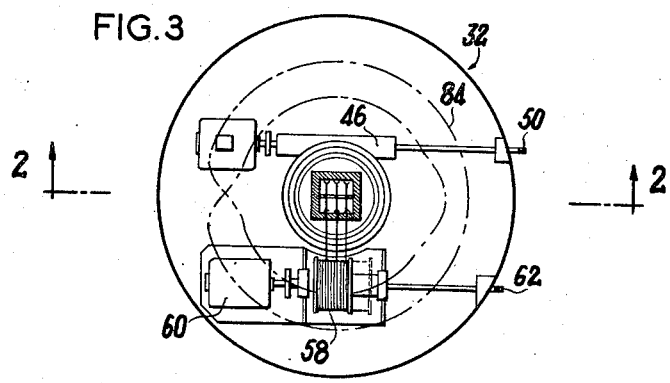
FIG. 3 is a plan view on line 3—3 of FIG. 2.

Referring to FIG. 2, the machine 32 includes a frame 36 having a set of rollers 38 rotatably mounted on the top of it and riding on a lower flange of the rail 34. For effecting displacement of the frame 36 along the rail there is provided a motor 40 mounted on the frame and acting on any suitable drive mechanism, such as a conventional rack and pinion arrangement (not shown). Supported below the frame 36 for rotation about a central vertical axis of it by way of vertically spaced ball bearings 44, is a plate or turntable 42. Rotation of plate 42 relative to the frame can be effected by means of an electric motor 48 supported on the frame and rotating the plate by way of drive gearing including a worm 46 (FIG. 3) rotated through spur gearing from motor 48 and meshing with a worm gear secured coaxially to plate 42. A gear, such as a Geneva-drive, is preferably interposed in the drive of turntable 42 whereby continuous rotation of motor 48 causes stepwise rotation of the turntable. Angular positioning of the turntable 42 can be effected manually when desired by way of a shaft projecting axially from worm 46 and formed with a square endpiece 50 engageable by a tool.

The frame 36 is provided with a central, verticallyextending tubular hub formed with a bore 52 in which is vertically slidable a grab 54 adapted to grip a fuel cartridge magazine as will be later described. The grab 54 is suspended through a cable extending through bore 52 from a hoist or pulley-block 56 mounted near the top of frame 36 and operated by means of a winch 58 (FIG. 3) drivable by a winch motor 60 mounted on the frame. Preferably, the winch drum is of the type that is automatically displaced axially as it is rotated as between the full-line and dotted-line positions in FIG. 3, so that the cable will be fed to the input pulley of pulleyblock 56 in the mean plane of the pulley regardless of the vertical position of the grab. The winch drum 58 can be angularly positioned manually by means of a rod projecting axially from it and externally provided with a square end-piece 62 for rotation with a suitable tool.

The frame 36 has a central downwardly projecting nose 64 of frusto-pyramidal form adapted to fit into a complementary recess formed at the upper end of the fuel cartridge magazines, as later described, to center the magazine in the correct orientation with respect to the frame 32 of the machine during fuelling operations. Supported on the rotatable frame plate 42 for radial displacement with respect thereto is a hoist carriage 66, supported in its upper part by means of rollers 68 riding on radial guideways 70 formed in the top of plate 42. Mounted in the lower part of carriage 66 is a winch 72 operated by means of an electric motor, not shown, supported on the carriage. A cable attached to the drum of winch 72 is wound over guide pulleys such as 78 and a tensioning roller 80 and has attached to its free end a further grab or claw member 74 adapted to move through a vertical guide channel 76 provided in a side of the carriage 66, and projecting downwardly through a radially-elongated aperture of table 42.

A pin 82 projecting upwardly from a side of winch carriage 66 engages in a guiding groove 84 formed in the under face of a plate 86 secured to the frame 36 above the carriage 66. Thus, on rotation being imparted to the turntable 42 relative to frame 32 by means of motor 48, the winch carriage 66 with the winch 72 carried on it are constrained to move radially with respect to the turntable and to describe with respect to the stationary frame 36 a path determined by the shape of the guide groove 84. The guide groove is shaped, in accordance with the invention, as a closed loop but aside from that condition may assume a variety of forms. One suitable shape is shown in dash-dot lines in FIG. 3, where the groove 84 is seen to consist of two generally concentric oval loops interconnected at a cross-over point, i.e., the shape of a figure 8 with its smaller loop folded over into the larger loop. The groove 84 may include more than two loop portions inside one another. The significance of the guide groove 84 thus shaped will become clear later, but it can already be said that the groove constrains the grab 74 to describe, step by step, a horizontal trajectory corresponding to the line along which the series of chambers of the fuel magazine, and the charging through passage of the said magazine, are disposed, thereby permitting the grab to service each of said chambers, and said passage, in turn.

A fuel element magazine 87 for use with the fuelling machine of the invention is illustrated in FIGS. 4 and 5, and comprises a cylindrical axial body or hub 88 coaxially surrounded near one end by an annular part 90. The upper end of central body 88 is formed with a pyramidal recess 91 complementary in shape to the hub nose 64 of the frame 36 of the handling machine 32 described above. The bottom end of recess 91 connects with a central cylindrical recess formed with an annular groove 92, into which the central grab 54 is adapted to engage so as to support the magazine 87. When the central grab 54 is operated to grip the groove 92 and then lift the magazine 87 until the recess 91 is firmly seated around the complementary nose projection 64 of the machine frame 36, cooperation of the nose and recess centers said magazine in the correct angular setting with respect to said frame with sufficient force and accuracy to enable the lateral grab 74 to be thereafter presented in proper registry with the chambers and passage of the magazine.

The annular body 90 of the magazine consists of a pair of parallel spaced circular plates interconnected by a series of parallel tubular members. One of these members 96 constitutes a through-passage having both ends opening through the respective plates; the other tubular members have their upper ends opening through a corresponding hole in the upper plate and their lower ends closed by the lower plate. Four of these chambers, designated by the reference numbers 98, 100, 102 and 104, are designed for particular purposes. The centers of the chambers and passage 96, as seen in plan, lie along a curve 106 congruent with the curve defining the aforementioned guide groove 84, and it will be seen from FIG. 5 that the center of the through-passage 96 is positioned at the cross-over point between the two loops of the curve. It will also be noted that the chambers 102 and 104 positioned on the outer and inner loop in the area most remote from the cross-over point may overlap for a proper construction of the corresponding tubular members.

In the exemplary embodiment being described, the chambers 98 of the outer loop and the chambers 100 of the inner loop are to receive irradiated and fresh fuel elements respectively. The reverse arrangement may be used if desired. In FIG. 4 a fuel element positioned in one of the inner chambers 100 is indicated in chain lines and is seen to project upwardly some distance beyond the top of the chamber. The two pairs of overlapping chambers 102 and 104 are for the reception of the plugs of the two fuel channels (and related charge tubes) which each magazine such as 87 is to reload, as will now be described.

In the operation of the particular embodiment described, the fuelling machine 32 utilizes a single magazine such as 87 to service in succession two fuel channels of the reactor core, each channel being adapted to receive ten fuel elements, topped by one dummy element followed by a plug; this in turn is followed by a plug of larger diameter, sealing the charge tube. Moreover, in the particular reactor to which the description refers, the fuelling cycle used is such that the lowest two fuel elements of each channel are subsequently reintroduced into the uppermost two positions of a cartridge train to be re-irradiated in the same channel of the reactor. This ensures a substantially equal overall irradiation for each cartridge despite the lower neutron flux present at the ends of a channel relatively to the flux in the midportion of the channel. It will be evident that the machine of the invention could be used just as well in circumstances involving different irradiation cycles and different numbers of fuel elements per channel, by suitably modifying the precise form of the magazines used.

Figure 6A:
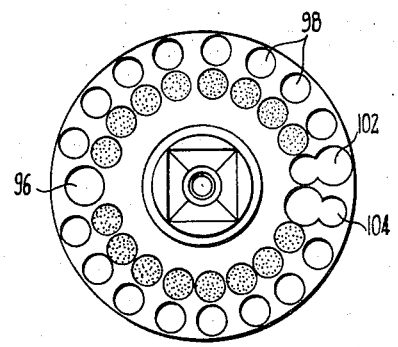
FIGS. 6a to 6d are views similar to FIG. 5, illustrating the conditions in the magazine at successive stages during a fuelling cycle involving the consecutive fuelling of two reactor channels.

A magazine 87 is introduced into the garret or upper chamber 18 of the reactor by a suitable device (not shown) which may be similar to that disclosed in the co-pending patent application referred to above. The magazine thus introduced contains a set of fresh fuel elements filling the inner circle of chambers 100, as indicated by the stippled cartridge positions in FIG. 6a. All remaining chambers are empty, and it will be noted that the thus loaded magazine is substantially balanced.

The machine 32 is positioned above the loaded magazine by suitably rotating the revolving monorail 34 and actuating the operating motor 40; the central grab 54 is then actuated to lift the magazine into engagement with the frame 36 in the correct angular setting, as explained above. In this position, as determined by the interengagement of the pyramidal parts 64 and 91, the curve 106 defining the centres of the magazine chambers is positioned in registry with the congruent curve defined by the guide groove 84 of the machine frame 36, and the lateral grab 74 is initially positioned directly below the cross-over point of the guide groove and above the through-passage 96 in the magazine.

The magazine 87 remains firmly and rigidly locked in this fixed relative position with respect to the machine frame 36 throughout the manipulations to be described, from the instant the magazine has been taken up by the machine to the instant it is deposited by it for removal out of the garret 18. The locking action of central grab 54 coupled with the interengaging-pyramidal parts described is strong enough to prevent any relative movement from occurring between the machine frame and the magazine even when unbalancing forces are generated, e.g., on partial unloading of the magazine.

The machine 32 is brought to a position corresponding to a first fuel channel to be processed, and specifically to a position such that the side grab 74 and the through-passage 96 of the magazine directly overlie the charge tube 24 corresponding to the fuel channel to be processed. The hoist 72 is now operated to lower the side grab 74, and the grab is actuated to grip the plug sealing the charge tube 24, which is the larger-diameter one of the two plugs mentioned earlier. The grab 74 is raised to lift the charge tube plug until it clears the upper surface of the annular body section of the magazine 87, and motor 48 is operated to rotate the turntable 42 with respect to the frame 36, until the grab 74 carrying the larger plug is positioned directly above the chamber 102 of the outer circle of the magazine.

It will be understood that during the rotation of the turntable by motor 48, the hoist-carrier 66 is moved radially of the turntable under control of the pin 82 engaging guide groove 84 so that the axis of the side grab 74, vertically aligned with said pin, follows a horizontal path corresponding to the curve 84 and hence corresponding to the center line curve 106 of the magazine chambers. Moreover, the rotation of turntable 42 from motor 48 is effected through a step-by-step drive as earlier mentioned, so that whenever turntable rotation is stopped, the axis of side grab 74 accurately overlies the center axis of a magazine chamber (or through-passage 96). It should further be noted that the guide groove 84 is provided with suitable conventional switch means (not shown) at the cross-over point, to cause the pin 82 to follow the loop sections of groove 84 in a smooth continuous manner.

With the side grab 74 carrying the larger plug overlaying outer chamber 102, the side grab winch is operated to lower the grab and insert the plug into said chamber 102.

Figure 6B:
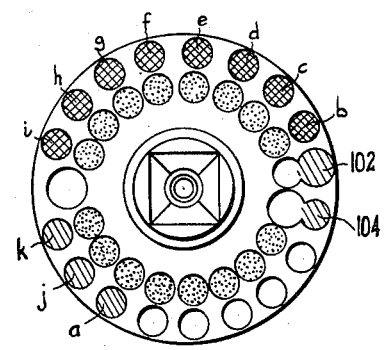

The machine is now operated in a generally similar manner to restore the side grab 74 to its initial position above passage 96, grasp the second, smaller-diameter plug sealing the fuel channel being processed, raise the plug clear of the magazine, and bring it to a position overlying the outer magazine chamber 104, then release the plug into said chamber. In the next operating step, the grab is restored to its initial position, lowered through passage 96 to grip the dummy element in the fuel channel, raised to lift it clear of the magazine and swung to a position overlying the chamber 98 designated a in FIG. 6b. In successive operating cycles, each of which involves bringing the grab 74 to its initial position over the through-passage 96, lowering the grab through the passage into the fuel channel, engaging a fuel element in the channel, raising the grab with the fuel element suspended from it, swinging the grab and fuel element to a position overlying a selected one of the outer chambers 98 of the magazine, and lowering the grab to deposit the irradiated fuel element into the chamber, the ten irradiated elements are extracted from the fuel channel and deposited in the ten chambers 98 designated b, c, d, e, f, g, h, i, j and k in FIGS. 6b and c. It will be noted that of the ten irradiated cartridges in the fuel channel, the upper eight, which are to be discharged from the reactor, are spent cartridges and are deposited in the eight sequential chambers 98b through i, while the two bottom fuel cartridges, which are to be reinserted into the top of the same fuel channel for a further irradiation run, in accordance with the fueling cycle earlier described, are deposited into the two chambers a and j adjacent the dummy element in chamber k. In FIG. 6b, the eight chambers 98 containing spent fuel elements that are to be discharged from the reactor are shown doubly cross-hatched, while the three chambers containing elements that are to be reinserted into the same channel are shown with single hatching.

When the fuel channel has been unloaded, the charging operation can proceed. This need not be described in detail since it involves a series of successive cyclic steps similar to those involved in the discharging process just described, performed in reverse. During the loading process, eight fresh fuel elements withdrawn from eight sequential inner chambers 100 of the magazine are first inserted in stacked relation into the fuel channel; these are followed by the two partly-irradiated fuel elements stored in outer chambers 98k and j, then by the dummy element from chamber 98a, and finally by the smaller-diameter plug in outer chamber 104 and the larger-diameter plug in outer chamber 102.

Figure 6C:
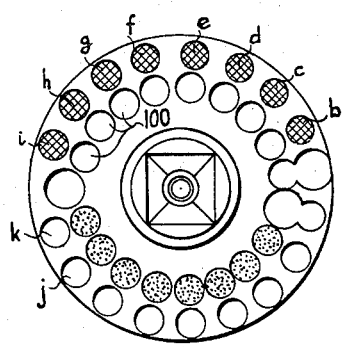

The handling of the first of the two channels is now completed; the magazine 87 contains elements in those of its chambers shown stippled (fresh fuel cartridges) and double-hatched (spent cartridges) in FIG. 6c, and the handling unit 32 is displaced so as to bring the through passage 96 over the next one of the two fuel channels to be serviced. This channel is now discharged and charged in a manner exactly similar to the first channel except for the particular magazine chambers involved.

Figure 6D:
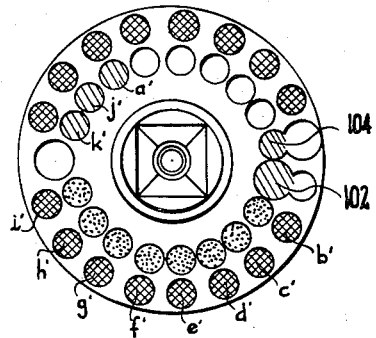

After the second channel has been emptied but prior to reloading, the condition of magazine 87 is that shown in FIG. 6d, with the charge tube plug and channel plug positioned in inner chambers 102 and 104, the dummy element in chamber a', the fully-spent cartridges in the chambers 98 designated b' through i', and the partly-irradiated two full cartridges in chambers 98j' and k'.

After the second channel has been re-loaded, the magazine contains spent cartridges in the chambers 98b through i and b' through i'. The handling unit 32 is now displaced to bring the magazine over a discharge station, and the central grab hoist 54 is operated to lower the magazine in readiness for removal out of the reactor vessel; the spent fuel elements are located in fluid-tight containers and sent to a deactivation pool.

It will be noted that in the particular working sequence described in detail above, the positions of the magazine chambers in which the partly-irradiated fuel elements, the dummy element and the channel plugs are temporarily stored, have been so selected that none of these elements is separated from the through-passage 96 by spent fuel elements along the cyclic path 106. This condition is required in the particular embodiment described because the fuel elements project above the magazine chambers as shown in FIG. 4, and their upper portions would otherwise interfere with the free movement of the aforementioned elements over the path 106 towards the through-passage 96. However, various other working sequences meeting this requirement can readily be conceived, and the magazine construction may readily be modified to make yet other work sequences possible, including sequences involving the handling of only one, or more than two, fuel channels at a time by means of a single magazine. Other modifications in the construction and operation of the handling unit and the associated magazine may be introduced within the scope of the invention.

What we claim is:

1. A handling machine for transferring a plurality of objects into and from at least one channel of a nuclear reactor, comprising, in combination: a magazine having a plurality of chambers for receiving said objects; a handling unit positionable in operative relation to said channel; means on said unit operable for engaging said magazine and for positively locking said magazine in a fixed predetermined position relative to said unit; grab means on said unit operable for engaging each of said objects; and means for displacing said grab means relative to said unit and to said magazine when locked relative thereto, between a position wherein said grab means is engageable with an object contained in said channel and any one of a series of positions wherein said grab means is engageable with an object contained in a selected one of the magazine chambers.

2. A handling machine for transferring a plurality of objects into and from at least one nuclear reactor channel, comprising: a magazine having a series of chambers for receiving said objects with their centers positioned at spaced points along a closed curve; a handling unit having a frame positionable adjacent to said channel; means on said frame operable for engaging said magazine and including means for positively locking the magazine in a fixed predetermined position relative to said frame wherein said curve has a predetermined point thereof aligned with said channel; grab means on said frame operable for engaging each of said objects; and means for displacing said grab means with respect to said frame over a path congruent with said curve in the locked condition of said magazine, between a position registering with said predetermined point of the curve and a position registering with any selected one of said spaced points of the curve, whereby to transfer an object selectively from said channel to a magazine chamber and vice versa.

3. A handling machine for transferring a plurality of objects into and from at least one fuel channel of a nuclear reactor, comprising: a magazine having a series of generally parallel cylindrical chambers for receiving said objects with their center axes positioned at spaced points along a closed curve in a plane generally normal to said axes, and further having a through-passage with its center axis parallel to said chamber axes and positioned on said curve; a handling unit having a frame positionable adjacent to said channel; first grab means on said frame operable for engaging said magazine and including means for positively locking the magazine in a fixed predetermined position relative to the frame wherein the plane of said curve is generally normal to the center axis of said reactor channel and said through-passage is aligned with said channel; second grab means on said frame operable for engaging each of said objects; and means for displacing said second grab means with respect to said frame over a closed path congruent with and parallel to said curve in the locked condition of said magazine, between a position registering with said through-passage and a position registering with any selected one of said magazine chambers, whereby to transfer an object selectively from said channel to a magazine chamber and vice versa.

4. The machine claimed in claim 3, wherein said positive locking means comprise a polygonally-shaped nose protruding from the frame of the handling unit and a complementarily shaped recess formed in an outer surface of the magazine for locking engagement around the nose.

5. The machine claimed in claim 3, wherein the means for displacing said second grab means comprise a part rotatable with respect to said frame about an axis generally parallel to said channel axis, means for mounting said second grab means on said part for radial displacement relative thereto towards and away from its axis of rotation; guideway means similar in shape to that of said curve carried on said frame; and follower means on said mounting means engaging said guideway means to constrain said second grab means to describe said congruent path on rotation of said part.

6. The machine claimed in claim 2, wherein said curve has at least two loop portions, one nested within the other and a cross-over point interconnecting said loop portions, and said predetermined point is at said cross-over point.

7. In a handling machine having displaceable grab means for transferring a plurality of objects into and from a channel of a nuclear reactor: a magazine structure comprising a body; means defining a generally annular array of generally cylindrical parallel chambers adapted for reception of said objects and having their centers disposed at spaced points along a closed curve; a cylindrical through-passage in said body having its axis parallel to said chambers and positioned at a predetermined point of said curve; and means on said body generally centrally of said array for locking said body in fixed relation to said reactor with said through-passage aligned with a channel thereof, for selective transfer of objects by said grab means between said reactor channel and any selected one of said magazine chambers by way of said passage.

8. The magazine structure claimed in claim 7, wherein said closed curve comprises at least two loops located within each other and interconnected by a cross-over point, and said through-passage is positioned with its center at said cross-over point.

References Cited by the Examiner
UNITED STATES PATENTS
3,044,947   7/62   Payne _____ 176—30 X HUGO O. SCHULZ, *Primary Examiner.*